Dec. 23, 1941.  C. O. FAIRCHILD  2,267,681
METHOD OF AND APPARATUS FOR CONTROLLING SYSTEMS
Filed March 19, 1937
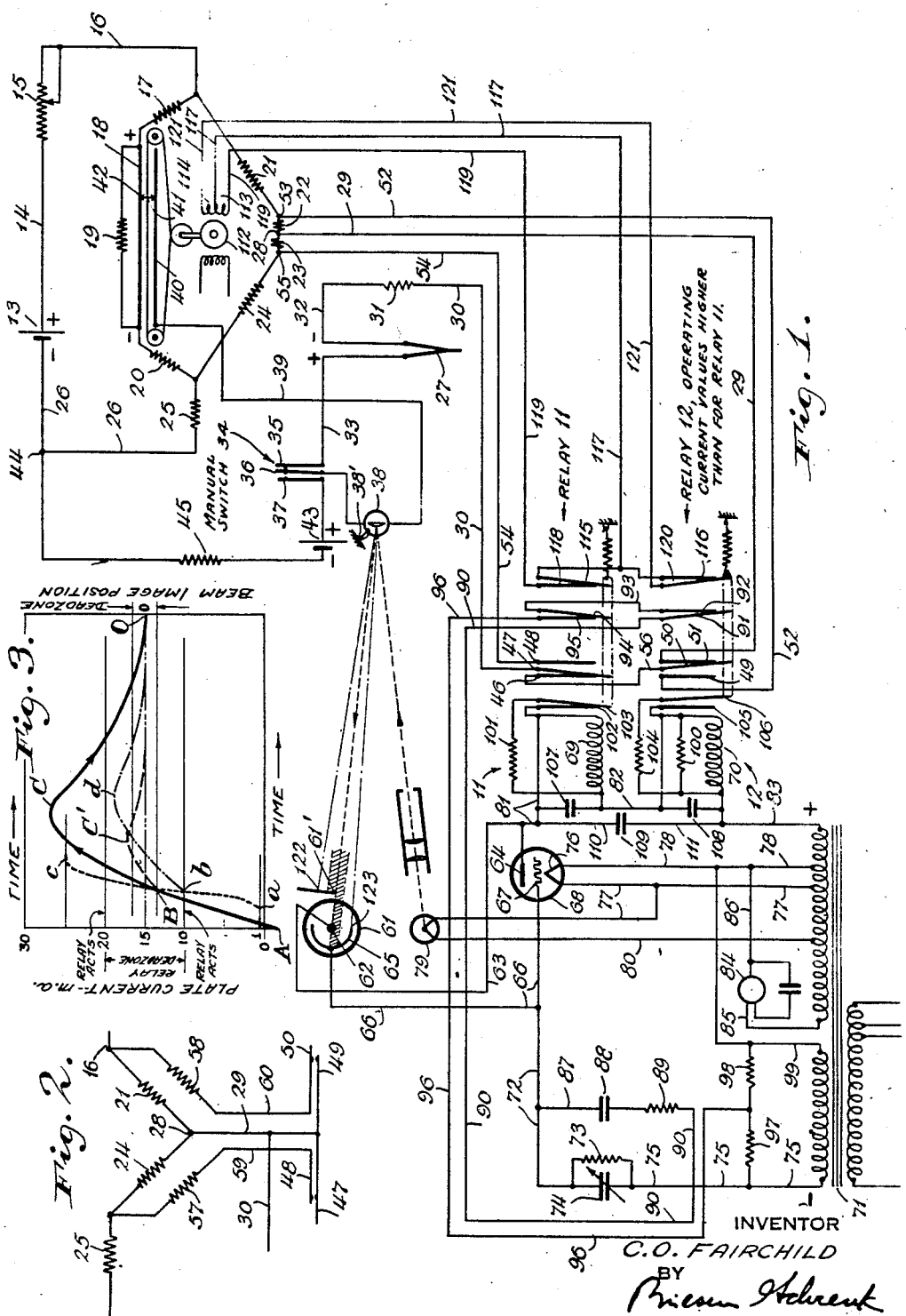
INVENTOR
C. O. FAIRCHILD
BY
ATTORNEYS Patented Dec. 23, 1941

2,267,681

UNITED STATES PATENT OFFICE 2,267,681

METHOD OF AND APPARATUS FOR CONTROLLING SYSTEMS

Charles O. Fairchild, St. Albans, N. Y., assignor to Charles J. Tagliabue Mfg. Co., New York, N. Y., a corporation of New York Application March 19, 1937, Serial No. 131,843

24 Claims. (Cl. 171—95)

This invention relates to methods of and apparatus for controlling systems particularly of the type, described in my Patent 1,970,559, which include a light source, a phototube (or other photoelectric receiver), a mirror galvanometer, and associated controlling circuits. This application is a continuation-in-part of my U. S. Patent No. 2,205,777, granted June 25, 1940.

A particular object of the present invention is to provide a controlling system which is simpler, less expensive, more sensitive, and more reliable than other systems which have been heretofore described for the purposes for which this invention is suitable. This invention differs from the one described in my patent mentioned above in the absence of periodic and intermittent exposure means operating between the moving mirror and photoelectric receiver and is characterized by a faster action and more sensitive controlling ability.

It may also be mentioned that it has heretofore been proposed to provide electrical remote control or follow-up systems in which the controlled element is moved at one rate of speed when there is a large disagreement between its position and the position of the control element, and at a slower rate of speed when the positions of the control and controlled elements are approaching correspondence. The present invention does not reside in such a two-speed follow-up system but is characterized by the following features.

According to the invention there is provided an electrical control system in which a motor for restoring a balancing system to equilibrium is controlled by relay means in a governing circuit, and a measuring element sensitive to departure of the balancing system from equilibrium controls the relay-energizing current in the governing circuit, the rate of restoration of said current to a value corresponding to equilibrium in the balancing system, following a departure from said value, being determined by one substantially fixed time-constant when the current is far from said equilibrium value and by another higher substantially fixed time-constant when the current is near said equilibrium value, i. e. near or in a dead-zone current range for the relay means.

The invention also resides in an electrical control system in which a motor for restoring a measuring circuit of the balancing type to equilibrium is controlled by relay means in a governing circuit, and a measuring element such as a galvanometer sensitive to departure of the measuring circuit from equilibrium controls the relay-energizing current in the governing circuit, the rate of restoration of said current to a value corresponding to equilibrium in the measuring circuit, following a departure from said value, being determined by one substantially fixed time-constant when the current is far from said equilibrium value and by another higher substantially fixed time-constant when the current is near said equilibrium value, i. e., near or in a dead-zone current range for the relay means.

The invention also resides in an electrical control system in which a motor for restoring a balancing system to equilibrium is controlled by two relays in a governing circuit, the closing current value of one relay being lower than the closing current value of the other relay, and the arrangement being such that, when both relays are open, the restoring motor will be operated in one direction while, when both relays are closed, said motor will be operated in the other direction and, when one relay is closed and the other open (i. e. when the current is in a dead-zone range), the motor will not be operated, and in which a measuring element sensitive to departure of the balancing system from equilibrium controls the relay-energizing current in the governing circuit, the rate of restoration of said current to a value corresponding to equilibrium in the balancing system, following a departure from said value, being determined by one substantially fixed time-constant when the current is far from said equilibrium value and by another higher substantially fixed time-constant when the current is near said equilibrium value, i. e., near or in a dead-zone current range for the relays. Preferably the time-constant of the governing circuit is increased in the dead-zone range by means including a capacitor in the energizing circuit of the relays.

According to a preferred form of the invention, the balancing system is of the Wheatstone bridge or potentiometer type and a sliding contact is moved in one direction or another by the governing circuit under control of a galvanometer to bring the value of an adjustable E. M. F. into correspondence with the E. M. F. of a thermocouple which changes in accordance with the value of a main variable.

In one form of the present invention, the beam of light from the moving mirror is focused upon the plane of a "controlling edge" of the photoresponsive receiver and moves in correspondence with variations of a controlled quantity, stably swinging to and fro across the edge and, through its effect on the receiver, operating relays which control a reversing motor, this motor being used for driving any suitable control device.

In the photoelectric circuit described here, the phototube is not a calibrated element but serves only to detect the displacement of a light-beam with reference to the controlling edge and in cooperation with the rest of the circuit to drive the controlled reversible motor in one direction or the other or to hold the motor against rotation, when the light-beam is in a normal position corresponding to no deflection from its so-called zero position. It will be evident from the following description that a new and improved method of control is provided which permits relatively rapid action of the reversing motor and at the same time provides a higher sensitivity.

In order to accomplish such a performance in a particularly simple way there are included in the photoelectric circuit two relays, one of which is adjusted to close at a different value of current from that required by the other and in which also are included means for delaying the starting or succeeding reversal of the reversing motor upon a deflection of the light-beam. There are also included in the control system one or more devices for bringing the moving mirror into phase with an oscillating variable quantity or to advance its phase ahead of that of the variable.

In a particular application in which the system is used for a recording device, the reversing motor may serve to adjust an electrical quantity to equal the corresponding value of a measured variable as it has been converted into an electric quantity, the mirror being attached in this case to the moving coil of a galvanometer which serves to indicate the difference between the variable and the adjustable electric quantity and, in particular, to indicate equality when the light-beam finds its normal or zero position.

Connections between electric contacts on the two relays and the reversing motor are such that when one relay is closed and the other open the motor stands still and when both relays are closed or both open, the motor runs one way or the other. Both relays will be open when the light-beam does not shine upon the receiver and both closed when all of the beam or a sufficient part of it does shine upon the receiver and one relay will be closed and the other open when a smaller fraction of the beam falls on the receiver, the beam in this case being split by the controlling edge. The cross-section of the image of the source in the plane of the edge in a direction perpendicular to this edge is kept small, but may be adjustable for reducing sensitivity as in my aforementioned U. S. Patent No. 2,205,777.

Before proceeding with a description in detail of the figures shown and the mode of operation of this system, it will be necessary to call attention to certain characteristics of moving-coil galvanometers. It is useful in describing such a controlling system as this to consider it in an oscillating condition and to consider the phase relation of various elements. In this particular system it will become apparent that the forces applied to the reversing motor are not in proportion to deflections of the galvanometer but take definite values as the relays operate in the manner described. It is hence apparent that in the manner in which this system might oscillate, there is no motion of a simple harmonic nature. Let us suppose for example that the reversing motor has reached full speed in one direction and that it is rapidly changing the current through the galvanometer at a constant rate. In this condition, the galvanometer develops a constant back E. M. F. proportional to its constant angular velocity and lags behind the motion of the motor by an amount measured by this back E. M. F. It has been discovered that this lag is reduced to zero when an auxiliary, advancing E. M. F. is applied to the galvanometer in series with the normal E. M. F. and equal and opposite to the generated back E. M. F. If the galvanometer is moving towards its normal position, then, when the light-beam reaches the normal position the motor is also at a corresponding position and, if both could be stopped suddenly, a correct control condition of the system would then be reached. If, however, the advancing E. M. F. is larger than the back E. M. F., the galvanometer leads the motor and the latter is stopped before reaching the normal position. Now, if this advancing E. M. F. has been applied through contacts arranged on the relays, it can be removed at the moment the first of the relays operates and this will cause an impulse resulting from the still unbalanced quantities to act against the tendency of the galvanometer to swing beyond the normal position because of its inertia. In fact, the advancing E. M. F. can be so large that by its removal the galvanometer will be kicked back from the normal position, as a result of which the relay which is operated will reverse its own action and the motor and galvanometer will proceed to take short steps towards the normal position at a rate depending upon the time-constant of the relay and its associated electric circuit.

It is apparent that owing to the presence of various inertial forces, the best value of the advancing E. M. F. is readily determined, following my above teaching, by experiment and will take into account the rapidity of action of the relays, the overrunning of the reversible motor, the operating characteristics of the galvanometer, and the scale range of the recorder. Suppose, for example, that a recorder has a full scale range of 10,000 microvolts traversed in 50 seconds at full motor speed and that it is necessary to determine a balance or to measure the variable quantity within 0.02% of full scale, corresponding to 2 microvolts, a span traversed in 0.01 second. To stop the motor in so short a time as this would ordinarily require power far in excess of that normally available in an instrument or controller of the type in mind. Moreover, a galvanometer sufficiently sensitive to serve for this purpose would have a back E. M. F. of, e. g., 50 times this value of 2 microvolts at the angular velocity corresponding with the speed of traverse mentioned, such that without the advancing E. M. F. mentioned above the galvanometer would be lagging by an amount far in excess of the required accuracy.

Another main object is the alteration of the time-constant of response of the instrument as the galvanometer traverses the limits of its dead-zone.

Thus, the chief objects are to provide methods and means for causing such a sensitive galvanometer to stably return to a definite balancing point and, in particular, by in effect temporarily shifting the balancing point upon a galvanometer deflection.

These and such other objects of the invention will appear to those skilled in the art from the accompanying drawing and specification, in which is illustrated and described a specific embodiment of the invention. It is my intention to claim all that I have disclosed that is new and useful.

Fig. 1 is a diagram of an electrical measuring circuit together with the photoelectric circuit with amplifier, relays and lamp, with which it cooperates.

Fig. 2 is the preferred embodiment of part of the system shown in Fig. 1.

Fig. 3 is a graph showing both beam position and plate current plotted against time.

Referring to Fig. 1, the temperature of thermocouple 27 is measured by the position of sliding contact 41 along its slide-wire 18. When these correspond, the reflected light beam from the mirror of the mirror-galvanometer is in the normal position as shown so that it is partly on and partly off phototube 61, the light beam being split by the shielding edge 61'.

In this normal position of the light beam, relays 11 and 12 are respectively closed and opened as regards the armature positions. Either relay is said to be closed when its armature is in the position closest to the relay coil and open when it is in its furthest position away from the coil of the relay. Some of the relay contacts are closed in the extreme positions of their armatures and are open during the instant in which the armatures are passing from one extreme position to the other. Each of the coil armatures is continuously biased away from its respective coil so that when the value of the current is above a predetermined value for that relay the armature is closed and one set of contacts is effective and when the current value drops much below the predetermined value, the biasing force holds the armature away from the coil so that the other set of contacts is closed.

Upon an increase, e. g., of the temperature of the thermocouple, the galvanometer swings the beam in a clockwise direction to decrease the illumination of the phototube and hence to decrease the relay current to increase to cause relay 12 to close which causes the reversing motor to operate to move the sliding contact upscale, i. e., to the right in Fig. 1.

*The potentiometric circuit*

A potentiometric circuit is shown in which the $ir$ drop in slide-wire 18 provides a potential gradient against which the potential due to the thermocouple 27 is compared. The standard cell 43 is connected with the galvanometer 38 by the manually-operated switch 34 when it is desired to check the calibration of the potential, the contact 36 being moved from the normal operating position shown in which contact 36 touches contact 35 to the opposite position in which contact 36 touches contact 37. In case the calibration is found not to be correct, adjustable resistor 15 is moved by the operator to a position to bring the galvanometer 38 to its normal position when the sliding contact 41 is at a predetermined position on its slide-wire 18, preferably at some selected point near the middle of the scale.

Starting with switch 34 in its usual operating position in which contact 36 touches contact 35 and with a balanced condition of galvanometer 38, the position of sliding contact 41 corresponds with the temperature of thermocouple 27 and motor 112 is stationary. In this balanced condition, the positive side of the thermocouple 27 is connected with the galvanometer and the negative side of the thermocouple is connected with point 28 of the potentiometric circuit.

Upon a decrease of the temperature of thermocouple 27 the mirror galvanometer turns in a counterclockwise direction to increase the amount of light reaching the phototube and may reach a stop 34' which is so disposed as to keep any of the beam from going off the cathode 65 of phototube 61. The increase of illumination of the phototube causes an increase in the current in relays 11 and 12 so that relay 12 also closes thus shifting the point of connection of the negative side of thermocouple 27 from point 28 of the bridge to point 53 since the negative side of the thermocouple is connected with point 53 by wire 32, resistor 31, wire 30, contacts 47 and 46 (which are closed when relay 11 is closed), wire 56, contacts 50 and 49 (which are closed when relay 12 is closed), and wire 52 to point 53. Point 53 has a higher potential than point 28 due to the $ir$ drop through resistor 22, the operating current being provided by battery 13. Consequently a shift of the connection of the negative side of thermocouple 27 from point 28 to point 53 lowers the effective potential and the current in galvanometer 38 so that the shift of the point of connection from 28 to 53 may be said to oppose the change in temperature of the thermocouple 27.

In case of an increase of the temperature of thermocouple 27, the galvanometer turns the beam clockwise so that it passes from the phototube onto the shield whose edge is 61' so that no direct light from the reflected beam reaches the phototube. In this condition, the current drops in the coils of relays 11 and 12 so that both relays open and the negative side of thermocouple 27 is connected with a point 55 of lower potential than point 28 due to the $ir$ drop in resistor 23. Following the current from the negative side of thermocouple to point 55, the current flows through wire 32, resistor 31, wire 30, contacts 47 and 48 (which are closed when relay 11 is open), and wire 54 to point 55.

Following the current around from the positive side of thermocouple 27, it flows through wires 33 and contacts 35 and 36 of the manual switch 34, through the coil of mirror galvanometer 38 and through wire 39 to the return bar 40 against which sliding contact 41 bears, as well as against sliding wire 18. The current returns through resistors 20, 24 and 23 to point 28 on one side of the potentiometric bridge and through resistors 17, 21 and 22 on the other side to point 28. From point 28, the current returns through line 29 by contacts 51 and 50 (which are closed since relay 12 is open), wire 56 and contacts 46 and 47 (which are closed since relay 11 is closed), wire 30, resistor 31, and wire 32 to the negative side of thermocouple 27. A more precise description of the potentiometric circuit follows: The potentiometer circuit is generally similar to that shown in my aforementioned U. S. Patent 2,205,777 and in which current from battery 13 flows through resistors 21, 22, 23 and 24, then to resistor 25, and conductor 26 back to 13. As earlier described at greater length, when the E. M. F. of the thermocouple 27 is not balanced by the potentiometer, current will also flow from the connection 28 through conductor 29, the contacts of relays 11 and 12 when the former is held closed and the latter open, through conductor 30, resistor 31, conductor 32, thermocouple 27, conductor 33, manually-operated switch 34 in the position shown, contacts 35, 36, the mirror galvanometer 38, conductor 39, the return bar 40 and the travelling contacts 41 (which may carry an indicating and/or recording element) to the then contact point 42 on the slide-wire 18. The current through the slide-wire is standardized in a conventional manner by throwing the switch 34 to the reverse direction connecting the standard cell 43 opposed to the battery, from the connection 44 through resistor 45, contacts 37, 36 of switch 34, galvanometer 38, conductor 39, bar 40, contacts 41 to the point 42 on the slide-wire, when 42 is at a predetermined position selected for convenience, as also explained in my U. S. Patent No. 2,207,343. When both relays are closed current can flow through the galvanometer 38, switch 34, thermocouple 27, resistor 31, contacts 46, 47 on relay 11, contacts 49, 50 on relay 12, conductor 52, to connection 53, and when both relays are open connection is made from 38 through contacts 47, 48 on relay 11, conductor 54 to connection 55.

Thus when the potentiometer is balanced against the thermocouple E. M. F. and relay 11 is closed and relay 12 is open, the point 42 is connected through galvanometer 38, switch 34, thermocouple 27, resistor 31, contacts 46, 47 on relay 11, conductor 56, contacts 50, 51 on relay 12, conductor 29 to connection 28. A scale (not shown) for the slide-wire 18 is calibrated with reference to the potential of the point 28, the normal connection in the balanced condition, the cooperating resistors (in particular, resistors 20, 23 and 24) being selected to have the scale zero correspond with the desired potential. It is apparent then that when the potentiometer is not balanced that an auxiliary E. M. F. in one direction or the other corresponding to the $ir$ drop in 23 or in 22 will be imposed on the galvanometer, the direction being chosen as described later.

Preferred and simplified connections are shown in Fig. 2, in which conductor 30 is permanently connected through conductor 29 to connection 28, and the relay contacts are reduced in number. Fig. 2 is for the normal condition in which relay 11 is closed and relay 12 is open, the operative connections being such that blades 47 and 50 are respectively movable by the armatures of relays 11 and 12. In Fig. 2, a downward movement toward the relays results when the relay coils are sufficiently energized to pull down the blades 47 and 50 which are continuously spring-biased upwardly, i. e., away from their respective relays. When both relays are open, contacts 47, 48 are closed but contacts 49, 50 are open. When both relays are closed, contacts 47, 48 are open but contacts 49, 50 are closed. Auxiliary E. M. F.'s are obtained from the far connections of resistors 24 and 21 through resistors 57 and 58 which are connected respectively to contacts 48 and 50 through conductors 59 and 60. In this figure the potential of 28 is altered by shunting resistor 24 with resistor 57 through conductors 59 and 29 and contacts 47 and 48 when both relays are open, or by shunting resistor 21 with resistor 58 through conductors 60 and 29, and contacts 49 and 50 when both relays are closed. By properly choosing the values of resistors 57 and 58 the shift of potential of 28 can be made equal to the value of the auxiliary E. M. F. required, and in this case, as in Fig. 1, the auxiliary E. M. F. will be to a first order of approximation, independent of the position of the contacts 41 connected to the slide-wire 18 at 42. Provided the resistances of 18 and the shunt 19 are not too large in comparison with the resistances of 38, 27 and 31 the effect of this E. M. F. on the deflection of the galvanometer will be sufficiently constant while 41 moves across the slide-wire, being least when 41 is in the middle and greatest when 41 is at either end. It will be shown that it is not essential to have an exactly constant effect, in subsequent discussion.

The governing circuit

As earlier noted, a counterclockwise movement of the reflected beam from the mirror galvanometer 38 causes an increase of the reflected light on the cathode 65 of phototube 61 and in turn causes an increase in the current of the relays 11 and 12 which, starting with the beam in its normal position, causes relay 12 to close when the illumination increases due to a decrease in temperature of thermocouple 27.

Again referring to Fig. 1, this shows the balancing power-circuit or governing system, which is electrically independent of the potentiometer-circuit, and includes the phototube 61 connected with its anode 62 through conductor 63 to the plate 64, and its cathode 65 through conductor 66 to the grid 67 of a triode 68, in the plate circuit of which are included the coils 69 and 70 respectively of relays 11 and 12. A transformer 71 is used to supply the various voltages of this circuit, no auxiliary rectifiers being used for the two tubes.

The grid 67 of the tube 68 is connected through conductors 66 and 72, through resistor 73 and adjustable capacitor 74 which are in parallel, and through conductor 75 to what is commonly called the negative terminal of the secondary of the transformer 71, a useful convention in this A. C. circuit which lacks a separate rectifier but has the phototube and the amplifier more effective in each half-cycle in which the potentials are as shown than in complemental half-cycles. Filament 76 of tube 68 is connected through conductors 77 and 78 to a low differential voltage portion of the secondary. The lamp 79 is also connected to a low differential voltage section in the secondary through conductors 77 and 80. The plate 64 is connected to the plus terminal of the secondary through conductor 81, coil 69, conductor 82, coil 70 and conductor 83. A synchronous motor 84 may be connected if required, as for driving a record chart, to the transformer through conductors 85, 86 and 78. A stylus, pen, or other indicating or marking means (not shown), is movable with sliding contact 41 across the chart which is moved at constant speed by motor 84 or along an indicating scale (not shown) as is well known in this art.

The thus-described phototube-amplifier circuit has been used before. However, it is believed to be novel and useful to provide such a circuit with means for altering the time-constant of the circuit to stabilize the balancing of the entire instrument, including the galvanometer, sliding contact, and the governing system itself. An auxiliary connection from the grid is made through conductor 87, capacitor 88, resistor 89, conductor 90 and contacts 91, 92 on relay 12 when this is closed, conductor 93, contacts 94, 95 on relay 11 when this is closed, conductor 96 to resistors 97, 98 bridging a portion of the secondary and connected to it by conductors 75 and 99 and constituting a semi-adjustable potentiometer across this portion. When capacitor 88 is connected in the grid circuit, the time of response and the time constant of the circuit are greatly increased or, in other words, the rate of response is much lower.

It may be permissible to briefly describe the action of a capacitor under transient conditions for the sake of those who are not actively working in this art. For such, it may be desirable to clear up a common misconception which is due to the occasional use of an incorrect hydraulic analogy, i. e., considering a capacitor as corresponding with a liquid reservoir in which the head or potential corresponds with a stored current which is a difference between the inflow and outflow currents. The following brief note on hydraulic analogies may also be helpful in making it easier for equivalents to be set up in other than electrical circuits, e. g., in hydraulic governing systems and the like, in which the invention may be used with the flow of any governing fluid occurring in the same sense generally as that disclosed for an electrical current flow.

Actually, where there is a flow of electrical current (following the usual convention) into a capacitor, there is at each instant an identical outward flow so that there is in one sense no "storage" of current in a capacitor as there is in a liquid reservoir. The storage in a capacitor occurs by putting the dielectric under a state of tension, a usefully-accurate hydraulic analogy of a capacitor being a closed chamber with a transverse resilient diaphragm through which the water cannot pass. Upon a current of liquid flowing into such chamber on one side of the diaphragm, there is an equal outflow from the chamber on the other side of the diaphragm at each instant with a gradual increase of the pressure which is necessary to cause a further displacement and stretching of the diaphragm.

If a shunting capillary (resistor) be provided from one chamber to the other, there will be a flow in the resistor due to the difference in pressure across the diaphragm so that the pressures or potentials on both sides of the diaphragm will finally approach the same value. Just as in the case of an electrical capacitor with a shunting electrical resistor, such a resistor-shunted capacitor in a fluid system has a definite and fixed time-constant with the characteristic, that the rate of change of the potential (pressure or voltage) is proportional to the value of the potential or strain (in diaphragm or dielectric).

Start, in a hypothetical case, with the mirror of galvanometer 38 in such a position as would direct a reflected beam to be full on the phototube if the light 79 were on, but with the light 79 out, i. e. turned off. Then, after the light has been out long enough for the governing circuit to reach equilibrium and for both relays to open, the light 79 is suddenly turned fully on.

The flow of current from the phototube 61 instantly reaches a value corresponding with the full amount of illumination. The grid potential changes at a high rate which depends upon the small capacity of 74 and the resistance of 73 and the circuit has a definite but very small time-constant, which means that the time of a given current response is very short.

Then relay 11 closes to introduce capacitor 88 and its series-resistor 89 into this circuit which greatly lowers the rate of response and hence increases the value of the time-constant, which means that the time of a given current response is greatly increased. In other words, a considerable time is required before relay 12 can close. This time is sufficient to permit the galvanometer to return from a ballistic overswing and for the relays themselves to act.

The photoelectric current divides through resistor 73 and capacitor 74 which are in parallel. If the photoelectric current flow change is instantaneous and the initial impedance of capacitor 74 is zero, the grid potential would be instantaneously altered at the start. Instead, said potential builds up steadily but very rapidly as the charge builds in the small capacitor 74 which in turn provides a current-driving potential across resistor 73.

As is well-known in this art, the value of the time-constant is simply $$\frac{1}{u} = rc$$

in the equation for the change of grid potential $e = e_0(1 - e^{-ut})$ where $r$ is the resistance, $c$ is the capacity, $e_0$ is the ultimate value of the change in the grid potential, $e$ is the Napierian base, and $t$ is the time.

When the second capacitor 88 is connected to the circuit it chiefly affects the value of the time-constant as earlier mentioned. The foregoing brief description is intended to show only the purpose and functioning of this operation of the governing circuit which provides a double time-constant of the governing circuit.

In the photoelectric circuit of Fig. 1, the two relays 11 and 12 may be different or alike in style but in either case relay 11 will be adjusted or selected to close at a lower current than relay 12 and the latter will open at a higher current than that which causes relay 11 to close. If the relays are identical, the operating current of relay 12 can be raised by shunting coil 70 with a resistor 100. Resistors 101 and 104 are provided for the purpose of equalizing the opening and closing currents of their respective relays 11 and 12 which otherwise would be troublesomely separated. When relay 11 closes, its coil 69 is shunted by resistor 101 through contacts 102, 103 and when relay 12 closes its coil 70 is shunted by resistor 104 through contacts 105, 106. In both cases, the resistors 101 and 104 are selected so that the releasing currents of the relays will be close to their operating or closing currents.

In order to prevent the relays from chattering because of the half-wave rectification of tube 68, coil 69 is shunted by capacitor 107, and coil 70 is shunted by capacitor 108 and the two coils in series are shunted by capacitor 109 connected to conductors 110 and 111. These three capacitors serve to smooth out the intermittent direct current and the variable magnetic flux in the relays.

Still referring to Fig. 1, the negative bias of the grid 67 is so selected that with no illumination falling on the phototube 61 the plate current will be well below the releasing or opening current of relay 11. With the phototube connected as shown with its anode to the plate and cathode to the grid, an increase of illumination will permit more electrons to flow from the grid thus decreasing its negative bias and consequently increasing the plate or relay current. As the illumination and the relay current increases, first relay 11 will close which will shunt its coil 69 with the resistor 101 as described and the current through coil 69 will be reduced at this level of illumination to a current value which is slightly above that for opening this relay but the plate current will be increased as the external impedance of the plate circuit is decreased. However the plate current will not increase to a value near the closing current of relay 12 unless there be a further increase of illumination. With a further increase of illumination and plate current, relay 12 will close, shunting its coil 70 and parallel resistor 100 with an additional resistor 104 through its contacts 105 and 106, and as this relay closes the plate current will again rise without further illumination of the phototube as the impedance of the external circuit is reduced by closing contacts 105, 106. At this level of illumination, however, the current through coil 70 is reduced to a value near the releasing or opening current of relay 12. But both relays stay closed as long as the level of illumination remains thus high. Upon a fall of illumination, relay 12 opens first and then relay 11 opens as the illumination further decreases.

Suppose now that the illumination of the phototube starts at a low level A (see Fig. 3) such that both relays are open and increases at a uniform rate, that the photoelectric current is proportional to the illumination, and that over the range of illumination used the mutual conductance of tube 68 is constant, then as the illumination increases at a constant rate the plate current will increase at a constant rate provided these rates are sufficiently slow. Considering for the sake of clarity that the circuit is operated with constant voltages (D. C.) instead of alternating, following the convention shown on Fig. 1, and considering now that the rate of increase of illumination is sufficiently high, then the time-constants of the plate and grid circuits and relays influence the rate of rise of the plate current. The rise of plate current will be retarded somewhat by the high inductance of the relays but not appreciably by any lag in voltage of the grid, the negative bias of which will increase very nearly in phase with the illumination, provided the capacitor 74 and the tube capacitances are sufficiently small and the change of grid current with plate current is negligible.

When the plate current reaches a value sufficient to close relay 11, contacts 94, 95 will close and the capacitor 88 will be connected in the grid circuit through contacts 91, 92 which are closed, because relay 12 is open, and through conductors 90 and 96. At this moment, the rate of decrease of grid bias is abruptly altered to be greatly retarded if the capacitance of 88 is of a higher order than that of 74. The capacitance of 88 is so chosen that the rise of plate current will be so retarded as to delay the closing of relay 12 for an interval large in comparison with the normal operating time of the relays. The values of resistors 89, 97, and 98 are chosen so that, for the normal position of the light beam as shown in Fig. 1, the grid voltage will not be changed by manually closing relay 11 while relay 12 is open. When finally the plate current has risen to a value sufficient to close relay 12, the capacitor 88 is removed from the grid circuit by the opening of contacts 91, 92 by relay 12 so that, when the illumination and plate current are decreasing from a higher value, relay 12 will open as promptly as possible. Likewise as before when relay 12 opens, capacitor 88 is again inserted which delays the opening of relay 11 upon a steady decrease in illumination. In other words, the relays act to insert capacitor 88 to nearly paralyze the grid circuit when the relay current is of such a strength as to indicate that the galvanometer is near its balanced position.

*The motor circuit*

The condition of the relays shown on Fig. 1, i. e. relay 11 closed and relay 12 open, indicates the balanced condition of the galvanometer 38 which in turn normally accompanies a correspondence of the position of sliding contact 41 and the temperature of thermocouple 27.

In this balanced condition, contacts 115, 118 are closed since relay 11 is closed so that shading coil 113 is energized and contacts 116 and 120 are closed (since relay 12 is open) thus likewise energizing coil 114 with the result that the motor 112 is electrically locked or braked to stay in its last-set position. Upon a decrease of the temperature of thermocouple 27, the reflected light beam from the mirror galvanometer 38 moves in a counterclockwise direction to increase the light on the phototube and hence to increase the relay current so that relay 12 also closes.

The primary purpose of the relays is to operate the motor 112, indicated as a shaded pole motor having a main coil connected to the line and having two shading coils 113 and 114 for reversing the motor. Contact 115 on relay 11 and contact 116 on relay 12 are connected through conductor 117 to both coils 113 and 114 of the motor. Contact 118 on relay 11 is connected through conductor 119 to coil 113, and contact 120 on relay 12 is connected through conductor 121 to coil 114.

*Description of operation*

The following résumé of the principal parts of the electrical circuits and their functions is included here for ready reference in reading the appended claims.

A. *Conventional potentiometer circuit.*—The slide-wire potentiometer circuit of Fig. 1 includes a thermocouple 27 and mirror galvanometer 38 normally connected in series between the movable contacts 41 and a fixed selected point 28 in this circuit.

B. *Means for advancing the phase of the galvanometer.*—This point is one selected from three fixed points, 55, 28, and 53 of different potential at the terminals of resistors 22 and 23, the selection depending upon the position of the relays 11 and 12 in the balancing power circuit. When a balance has been obtained (the galvanometer is at its normal position with no current flowing through it), the connection is to point 28 and the shifts to points 55 or 53 are for the purpose of applying an advancing E. M. F. to the galvanometer as it returns, from a swing away from the normal position in either direction, towards the normal position at which it reflects a beam of light towards the controlling edge 61' of the phototube 61. An alternative circuit for the application of an advancing E. M. F. is shown in Fig. 2.

C. *Method of stopping the motor.*—In the potentiometer circuit of Fig. 1, the potential difference between the moving contact 41 made with its contact-point 42 on the slide-wire and the fixed point 28 in the other branch is balanced against the E. M. F. of the thermocouple 27 by the reversible motor 112 with its two shading coils 113 and 114, either of which is shortcircuited to start and drive the motor and both of which are shortcircuited to stop the motor, the connections of these shading coils being changed by the operation of the relays.

D. *Amplifier part of balancing power circuit.*—The balancing power circuit or governing system is not conductively connected at any point to the abovementioned potentiometer circuit. The balancing power circuit includes the transformer secondary, the amplifier tube 68, the light source 79, the phototube 61, the two relays 11 and 12 naving contacts insulated from this circuit but connected into the potentiometer circuit for shifting the connections to points 55, 28 and 53 therein, and contacts in the balancing circuit for operating the reversible motor.

E. *Means for retarding the relay action.*—The balancing power circuit also includes contacts 91, 92, 94 and 95 for connecting the capacitor 88 when relay 11 is closed and relay 12 is open to retard changes in the potential of the grid and hence of the plate current and of the relays themselves.

Considering the actual case where the temperature of thermocouple 27 has been steady for at least a long enough time for the entire instrument to reach a condition of equilibrium with the slider 41 at a position on slide-wire 18 corresponding with the value of the temperature of the thermocouple, the mirror of galvanometer 38 is in the position to cause the light beam to split the phototube-shielding edge 61' as shown in Fig. 1 and with relay 11 closed and relay 12 open, closed and opened referring, as earlier mentioned, respectively to near and far positions of their armatures.

Assume that the temperature surrounding thermocouple 27 suddenly changes to a new and higher steady value. Due to the lag of the thermocouple the current in the galvanometer 38 will increase gradually to a new value so that the mirror turns its reflected light beam in a clockwise direction to position 122 on Fig. 1 in which the beam is completely shielded from the phototube. The photoelectric current instantly drops from 15 m. a. to 1 m. a. using the values of Fig. 3. The potential of grid 67 gradually drops as capacitors 74 and 88 gradually discharge through resistor 73 so that the grid potential gradually approaches the potential in line 75 with the result that the minimum plate current flows through the coils of both relays and relay 11 also opens so that both relays are now open.

When relay 11 opens, it disconnects capacitor 88 from the governing system to greatly increase the rate of response and hence to decrease the time-constant, which means that the time for a given response is considerably reduced, so that the governing system is much more lively than before when capacitor 88 was connected with the same. In other words, the governing system is then quickly responsive to any changes of illumination so that the relay 11 can act very quickly following an increase of illumination of the phototube.

The opening of relay 11 closes contacts 47 and 48 to connect point 55 to change the point of connection of the negative side of thermocouple 27 from its normally connected point 28 to point 55 of the potentiometer circuit with the result that the mirror galvanometer will be balanced sooner than it would if it were not for this change from point 28 to 55. The opening of relay 11 also opens contacts 115 and 118 to leave contacts 116 and 120 of relay 12 closed so that coil 114 of the reversing motor 112 causes the motor to drive the sliding contact 41 upscale towards its new position which corresponds with the new value of the temperature of the thermocouple.

Shortly before the sliding contact reaches the proper position, the galvanometer mirror swings the beam of light back in a counterclockwise direction so that it is on the phototube. The photoelectric current flow initially increases quickly to raise the grid potential quickly and hence to build up the plate current quickly to a value which causes relay 11 to close thus closing contacts 94 and 95 to introduce capacitor 88 again into the governing circuit so that further changes of illumination of the phototube cannot for a considerable time thereafter cause further operation of either relay 11 or relay 12.

The closing of relay 11 also shifts the point of connection of the negative side of thermocouple 27 from point 55 back to the normal point 28 which snaps the balancing point of the galvanometer from one position (which strongly tends to advance the galvanometer) back to its normal position (in which the galvanometer is not pulled forward as hard as it was before). The result is that, if the *ir* drop across resistor 23 be sufficiently high, the galvanometer may be even kicked back, a situation which will not be considered immediately below but will be considered further somewhat later herein.

Ordinarily the dead-zone is narrow and the galvanometer is so damped, which damping is proportional to its back E. M. F., that it will swing only a little beyond the balance point due to the inertia of the galvanometer, after which it will return asymptotically to its balance point assuming that, in the meantime, the motor 112 has coasted to a stop with slider 41 at the proper position. This motor is stopped in at least approximately the proper position since the advancing E. M. F. advanced the closing of relay 11 which closes contacts 115 and 118 which short coil 113 so that both coils 113 and 114 of the motor 112 are now shorted which causes the motor to be very heavily braked to a stop. If the slider 41 is not now at the proper position, the galvanometer 38 will move slightly in the proper direction to cause a further additional step or so which will merely repeat the operation aforementioned if the step be in the same direction.

However, if it be necessary for accurate measurement for the motor to run in the other direction, that is, due to an increase of temperature of thermocouple 27, the operation is as follows: Starting with a balanced condition as before but with a sudden decrease of temperature of the thermocouple, the potential of line 33 increases so that sliding contact 41 must be moved downscale or to the left in Fig. 1 along slide-wire 18. The current flows through galvanometer 38 in a direction to cause the galvanometer to move the light beam in a counterclockwise direction so that the illumination of the phototube and the relay current are increased so that relay 12 closes, thus putting relays 11 and 12 into the closed condition.

When relay 12 closes it opens contacts 91 and 92 to remove capacitor 88 from the governing circuit and hence to increase the rate of response of the relay current to a change in the illumination and to decrease the time-constant of the governing circuit so that the response time will be decreased with the result that relay 12 will open very shortly after a rebalancing of the galvanometer.

The closing of relay 12 also closes contacts 50 and 51 so that the balance point is shifted from its normal point 28 to point 53, which shift increases the force driving the galvanometer 38 back towards its normal position. The closing of relay 12 opens contacts 116 and 120 for coil 114 which leaves coil 113 alone effective to drive motor 112 to move slider 41 to approach its new position. In the meantime, the galvanometer has stopped its natural swing and starts to return toward a temporary position which is beyond the normal position and on the opposite side from the direction of the swing by an amount which depends upon the *ir* drop across resistor 22. As the light beam traverses its normal position, the illumination of phototube 61 now decreases so that the current through the relays falls off rapidly and relay 12 soon opens.

The opening of relay 12 closes contacts 91 and 92 to insert capacitor 88 again into the governing circuit. This decreases the rate of response of the governing circuit to further changes which greatly increases the time-constant and the time of response to further changes and gives the galvanometer a chance to settle down within the dead-zone without a further operation of either relay. The opening of relay 12 opens contacts 49 and 50 and at the same time closes contacts 50 and 51 to connect the negative side of thermocouple with the normal point 28 of the potentiometer circuit, so that the balancing point is shifted from its position beyond the normal position back to its normal position. The early opening of relay 12 also closes contacts 116 and 120 which short coil 114 so that both coils are shorted and motor 112 is electrically braked to a stop so that slider contact 41 stops in at least approximately the right position.

In the foregoing, a complete cycle of operation has been followed through in a cursory manner for a change of temperature of thermocouple 27 in each of opposite directions. However, the following description of the operation is more exhaustive and hence more accurate especially as to the relative timing of changes of the temperature of the thermocouple, the position of the galvanometer, the position of the slider 41, and the condition of the governing circuit and of the relays.

In order to help in understanding the manner in which this controlling system operates, Fig. 3 is provided. Two cases are illustrated in this figure. The first case is hypothetical and shows the operation where the governing circuit is subjected only by the relays to the advancing E. M. F. by shifting the point of connection of the thermocouple 27 from 53 to 28 but not to change the time-constant of the governing circuit by the introduction of capacitor 88 by the relays.

In the second case the relays act to subject the governing circuit both to the advancing E. M. F. and to a change of the time-constant due to the introduction of capacitor 88 by the relays when the value of the relay current corresponds with the balanced position of the light beam illustrated in Fig. 1. In Fig. 3, the plate current of triode 68 and the position of the median line of the light image in the plane of the "controlling edge" are both plotted against time. Movement of the image is shown in the first case along the solid line A—B—C with a sudden slight bend at B, and in the second case along the solid line A—B and dashed line B—C', these two curves being referred to the ordinates identified on the right. Corresponding variations in plate current are shown as the dotted line *a—b—c* in the first case, and in the second case as the dotted line *a—b* and the dot-dash line *b—d*. these two curves being referred to the ordinates identified on the left. Instead of a single normal position, there is shown here to a greatly enlarged scale, a region of relay insensitivity or so-called "dead-zone" extending in both directions from the controlling edge. The dead-zone of the image position of the beam is referred to the ordinates identified on the right, and the dead-zone of plate current on a still larger scale is referred to ordinates identified on the left and bounded by values of (e. g.) 10 and 20 milliamperes. It is assumed in this figure, for the sake of clarity, that when the relays operate there is no change in plate potential, and hence current, resulting from the introduction of the relay shunt resistors 101 and/or 104 into the circuit of Figure 1.

Having identified and described the essentials of the circuits, let us suppose that the E. M. F. of the thermocouple 27 is less than the difference in potential between points 28 and 42, or its contact 41, in the potentiometer and that the galvanometer 38 is deflected so that the beam of light is off the phototube 61 on the far side of its controlling edge 61' as shown at 122, Fig. 1, stops on the galvanometer being arranged as earlier noted to prevent it from deflecting the beam off the phototube on the other side beyond the point 123. Since there is now no light on the phototube, the plate current of triode tube 68 will be low, as at *a*, Fig. 3, as determined by sufficient negative grid bias, and so the plate current will be insufficient to close the relays. Coil 114 of the motor will be shortcircuited by contacts 116, 120 of relay 12 as described and the motor then will be running in a direction to move the contacts 41 down scale towards a value of E. M. F. difference between 42 and 28 which is equal to the E. M. F. of the thermocouple.

The deflection of the galvanometer from its normal position will now be proportional (neglecting inertia and damping factors) to the difference between the E. M. F. of the thermocouple and the potential difference between points 42 and 55, point 55 being now connected with the thermocouple by contacts 47 and 48 of relay 11. The galvanometer deflection will consequently be less than it would be if the thermocouple were connected to point 28. Let us now suppose for the purpose of further explanation that this deflection is made less by exactly the equivalent of the back E. M. F., an effect obtained by making the *ir* drop in resistor 23 equal to this value, and that relay 11 closes instantaneously when the plate current reaches the closing value of 10 m. a. for example, and that the motor stops instantaneously with the operation of relay 11 which closes contacts 115 and 118 so that both coils 113 and 114 are shorted. Under such hypothetical circumstances, when the light beam reaches position B, Fig. 3, which position we will assume for the moment corresponds with the closing current of relay 11; this relay will close, the motor will stop and the thermocouple connection will be shifted from 55 back to 28 by the opening of contacts 47 and 48. An instant after these actions, the galvanometer will be at its normal position and the sliding contact 41 will be at its proper position, the potential difference between points 42 and 28 will equal the E. M. F. of the thermocouple and there will be no external net E. M. F. applied to the galvanometer.

There will, however, remain the back E. M. F. in the galvanometer circuit. The resulting current through the still moving galvanometer together with the restoring torque of its suspensions will serve to bring it to a stop as along the line B—C. Having come to a stop at C, it will presently swing back to the normal position as shown along C—O while the reversing motor remains stationary provided that, during the interval between the closing of relay 11 and the return of the galvanometer to its normal position, the plate current has been so delayed in its rise, e. g. along line b—d, as not to reach the closing current value of relay 12. If the rise in the plate current had not been delayed by throwing capacitor 88 into the grid circuit, but had maintained its rate along the line b—c, relay 12 would have closed. Now if we consider that time is necessary for relay 11 to close and that the motor will overrun after such closing, then it becomes apparent that the advancing E. M. F. should be increased to compensate for these conditions. Thus if the advancing E. M. F., i. e., the ir drop in resistor 23, is made equal to the back E. M. F. plus the E. M. F. corresponding to the angle swung through by the galvanometer during the closing time of relay 11 plus the slide-wire E. M. F. covered by the motor during its overrun, then it is apparent that the motor will stop contact 41 at a position 42 corresponding to the proper position as above and likewise the galvanometer will finally come to rest at the same normal position as described in the hypothetical instance. It is also apparent that the motor will remain stopped at such a position of 42 that the galvanometer will come to a stop within the dead-zone as along dashed line B—C'—O provided the advancing E. M. F. was not so large that the galvanometer will be backed out of the dead-zone nor so small that it will not swing back into it after having passed through it, for in the former case relay 11 will reopen and in the latter case relay 12 will close.

While it may seem to have been implied that the dead-zone may have a considerable magnitude, its magnitude need not be large. In fact, it can be made quite small, as will be clear from the following consideration. In the hypothetical case, the galvanometer may swing through quite an angle after relay 11 closes while it is being brought to rest mainly by the retarding action of its generated back E. M. F. But in the real case, the net E. M. F. acting upon the galvanometer at the instant following the closing of relay 11 may be much larger than the back E. M. F., being the sum of three parts as mentioned above with the result that the retarding force on the galvanometer may be sufficient to stop it within a very small angle. During the brief interval of time for such stopping, the overrun of the motor is also finished so that the motor and galvanometer come to rest at the same instant. This desirable performance has been found by experiment and adjustment to be readily attainable, and it has been found to be no longer necessary to apply large forces to the relays and motor, or to incorporate auxiliary rectifying devices in the balancing power circuit to speed up the relays and to lock the motor with direct current.

A fuller explanation of the stepping operation just mentioned is as follows:

Assume that an increase in temperature of the thermocouple has occurred and that the galvanometer has deflected the light beam in a clockwise direction and the phototube current is so low that both relays are open. Capacitor 88 is disconnected from the governing system by opening of contacts 94 and 95 when relay 11 opens. The point of connection on the negative side of the thermocouple is shifted from its normal point 28 to point 55 by the closing of contacts 47 and 48 when relay 11 opens. The motor is being driven upscale at full speed due to the opening of contacts 115 and 116 when relay 11 opens to open coil 113 so that only coil 114 is left effective.

Also assume that the ir drop across resistor 23 is so great that the closing of relay 11 when the light beam reaches the dead-zone would, by the removal of said ir drop, cause the galvanometer to kick the light beam back out of the dead-zone which is what happens when the slider 41 approaches its proper position but has not quite reached it. In other words, when the light beam moves in a counterclockwise direction far enough, the phototube is sufficiently illuminated to cause relay 11 to close.

The closing of relay 11 does three things: it includes capacitor 88 in the governing system to delay the next operation of the relays, it acts to heavily brake motor 112, and it also acts to shift the point of connection of the negative side of the thermocouple from point 55 back to the normal point 28 with a potential change which is so great as to reverse the direction of the current through the galvanometer and cause it to kick the light beam back out of the dead-zone so that relay 11 opens as soon as it can in spite of the delay which accompanies the inclusion of capacitor 88 in the governing system.

Since the stopping of the motor was premature, the galvanometer is kicked back briefly from the same side of the dead-zone so that the light beam is soon again brought to within the dead-zone and meanwhile the motor has taken a short step to move slider 41 a little further in the same direction. Very soon after the light beam re-enters the dead-zone, the current in the governing system changes, since capacitor 88 is still disconnected with the result that relay 11 is reclosed with the earlier described consequence. This stepping action may be repeated several times although not more than a single step is required on the average in commercial practice.

All of the above described actions result similarly when the circuit of Fig. 2 is employed, in which the shift of potential of point 28 can be adjusted to the same magnitude as the ir drop selected in resistor 23, Fig. 1. It is apparent also that detailed consideration would develop the fact that the performance in a reverse direction, in which the releasing time of relay 12 is included, instead of the closing time of relay 11, will arrive at the same qualitative results. Reasonable smallness of asymmetry of action is both desirable and attainable, as has been found also by experiment.

While in Fig. 3 and in the description of the performance of the apparatus, the assumption is made that there is no sudden change in plate current whenever relays 11 or 12 act, there is actually such a change as explained in the description of Fig. 1. The sudden increases in plate current when these relays close are of no significance in the operation of the apparatus provided the amplifier is sufficiently powerful to supply current substantially in excess of the requirements. In other words, it is sufficient if the closing current of relay 12 is substantially greater than the plate current observed the instant after relay 11 closes and is also substantially less than the maximum plate current available.

The terms and expressions which I have employed are used as terms of description and not of limitation, and I have no intention, in the use of such terms and expressions, of excluding any equivalents of the features shown and described and portions thereof, but recognize that various modifications are possible within the scope of the invention claimed. Where the word "system" occurs in the claims, and especially where a governing system is referred to, this is for the means stated to operately connect the sensitive member with a final controlling element which final element operates to perform a function related to the value of the member-sensed variable and may be either an exhibiting means such as an indicator, a pen or other marking device or may be a sliding contact, a variable controlling-resistor or any equivalents.

When a plurality of time-constants is referred to in the hereinafter appended claims, such term defines consecutively different magnitudes of a damping effect. The "time-constant" refers to an effect, regardless of how it is produced, instead of to a cause. In other words, it is the time-constant of a response of a condition such as, by way of example, a relay current to a change of illumination of a phototube, instead of being limited to a product or ratio of values of resistance, inductance and capacitance. The term "time-constant" of response has its usual meaning: a rate of change of the response per unit of the yet-unfulfilled portion of the response or, alternatively, the time it would take the response to be complete if continued at the rate of change of the response at the instant considered. Mathematically expressed, for the response of current $i$ to a sudden change of illumination to have a single time-constant $K$, the current $i$ must have the following exponential relation with time $t$:

$$i = i_0 e^{-t/K}$$

where $i_0$ is the ultimate current change and $e$ is the Naperian base. While conventional instruments may be considered to have a plurality of time-constants of response, these are not limited to damping and simultaneously, instead of consecutively, include either at least a second time-constant or a harmonic function, due to the inertia of the instrument, having a generally unstabilizing effect.

I claim:

1. The steps in the method of controlling a member the position of which is affected by an independent variable which is to be measured or controlled, which member governs a final element in accordance with the value of a physical condition of a governing system of an instrument of the measuring or controlling class, which steps comprise regulating the physical condition in dependence upon the position of the member, and simultaneously altering in accordance with the value of the condition both the time-constant of the response of the condition to a change of the position of the member and the position of the element, in a balancing direction, to alter another variable reacting upon the member.

2. In measuring and controlling, in the null-method of altering one variable voltage by a motor to balance another variable voltage which is to be measured or controlled, the difference in voltages being indicated by a galvanometer, the step of algebraically and continuously adding a correcting voltage to one of said voltages according to the sign of the indicated difference of said voltages, said correcting voltage being of a greater magnitude than that required to compensate for the back E. M. F. of the galvanometer and the momentum of the motor.

3. The steps in the method of stably controlling a measuring or controlling instrument which includes an initial member movable in accordance with the value of an independent physical variable to be measured or controlled, a final movable element to be controlled in accordance with the member-sensed value of the variable, and a governing system operatively connecting said elements to govern the movements of the final element by those of the initial member, which steps comprise regulating the value of a physical condition of the system in accordance with the position of the initial member; altering, in accordance with the value of said physical condition, both the ratio of the change in the value of said physical condition to the amount of movement of the initial member and the effective time-constant of the response of the value of said physical condition to a change in the position of the initial member; and governing the moving of the final element in accordance with the stated response of the physical condition of the governing system.

4. The method of controlling a measuring or controlling instrument responsive to an independently variable voltage which is to be measured or controlled according to the position relative to a phototube of a light beam from a galvanometer, and in which a governing system includes a phototube and its amplifier whose output of amplified current depends upon the relative positions of the light beam and phototube, and a controlling means acting in response to the amplified current of the phototube and having a dead-zone which includes a null-position of the galvanometer in which the light beam is partially on the phototube, which method comprises continuously influencing the position of the galvanometer according to the independently variable voltage, altering the time-constant of the governing system to variably delay the response of the amplified current to a change in the position of the light beam, and also influencing both the galvanometer and the stated alteration of said time-constant of the governing system in accordance with the value of the amplified current of the phototube through the action of a portion of the controlling means which acts only in response to such current when such current is outside of the stated dead-zone to stably bring the light beam to rest at the stated null-position.

5. In the method of controlling a member which is deflected from a normal position in accordance with changes in the value of an independent variable which is to be measured or controlled, which member acts upon a final element through a governing system which operatively connects said member with said final element in accordance with the value of a physical condition of the governing system, and which system in turn governs in accordance with the value of its condition a servomotor means for positioning said final element, the steps of varying the physical condition in response to the stated deflection of the member, and, when the condition substantially reaches a predetermined value which ultimately corresponds with the normal position following a deflection and a return member from its normal position and a return toward said position, sharply altering the time-constant of response of the governing system to abruptly reduce the rate of return of the condition toward said predetermined value.

6. In an electrical circuit in a measuring or controlling instrument, the combination of an amplifier of a variable electric signal current, two relays operable at different values of the amplified current, means operatively connected with said relays and said amplifier to alter the amplified current in a direction to reduce a departure of the current from the range between said values except when only one of said relays is closed, and means operatively connected with said amplifier and with said relays to increase the time constant of response of the amplified current to a change of the signal current also when only one of said relays is closed.

7. In a measuring or controlling instrument connectable to a source of variable E. M. F., the combination of a reversible motor having means to actuate and to electrically brake the same, an electrical circuit having a fixed point and including a slide-wire, and a slide-wire contact movable by said motor for varying the E. M. F. of said movable contact relative to that of said fixed point, a galvanometer and the source of variable E. M. F. connected between said fixed point and said movable contact, a mirror on said galvanometer movable in response to changes in said independently variable E. M. F. and the E. M. F. of said movable contact, said mirror galvanometer having a normal position corresponding to no current flow therethrough, a source of light, photoresponsive means so arranged that a light beam reflected by said mirror is directed towards said photoresponsive means, said galvanometer having a stop arranged relative to said mirror to keep the deflection of its reflected beam upon said photoresponsive means when the beam tends to depart from one side only, means for amplifying the current from said photoresponsive means, two relays connected with said amplifying means and operable at different values of the amplified current, said relays having contacts for controlling said motor, contacts operable by said relays for altering the potential of said fixed point for affecting the relation between the movements of said galvanometer and said motor in a balancing direction, other contacts operable by said relays, and means having appreciable capacity cooperatively connected by said other contacts to retard the response of the amplified current to changes in the position of the reflected light beam relative to said photoresponsive means only while one set of relay contacts is open and the other set closed, the motor-controlling contacts being arranged to be connected to the braking means of the motor to cause the electrical braking of the motor only while one set of relay contacts is open and the other set is closed.

8. In a stable measuring or controlling instrument having a final device including an element which is to be positioned in correspondence with the value of an independent physical variable which is to be measured or controlled, the combination of a member which is continuously freely deflectable relative to a balancing position and is sensitive to said variable and to a balancing variable; a governing system, said member being operatively connected with said system to substantially continuously govern the value of a physical condition of said system over a range of positions including the balancing position so that such value corresponds with the position of said member over said range of positions; means for controlling said balancing variable by said element, and operatively connected with said member to affect the position of said member; means connected to the governing system for altering the time-constant of response thereof to changes in the position of said member over said range of positions; and relay means operatively connected with the governing system, with the controlling means, and with the response-rate altering means, to be governed by the value of said condition of the governing system relative to that corresponding with the balancing position of said member to effect the operation of the controlling means to alter the balancing variable in a direction to balance the independent variable and hence restore said member to the balancing position, and to effect the operation of the response-rate altering means so that the response-rate of said condition is slowed over a range of values of the condition of the governing system including that which corresponds with the balancing position of said member.

9. In a measuring or controlling instrument, in combination, a member sensitive to a variable physical quantity, a device to be controlled by said member according to the sensed value of the variable, and an electrical governing system including relay means controlled by said member and controlling said device, said system having elements providing a plurality of distinct time-constants consecutively effective for stabilizing the control of said device by said relay means.

10. In an instrument of the measuring and controlling class, the combination of a primary member whose position is sensitive to a variable physical quantity, a final device having an element whose position is to be controlled in ultimate correspondence with the member-sensed value for producing an operative effect in accordance with said value, and an electrical governing system in which the value of an electrical condition is controlled by said member to tend to correspond with the position of the member over a narrow range of positions and to have a lower value of said condition with the member on one side of said range and a higher value of said condition with the member in any operating position on the other side of said range, and the value of said electrical condition governs the stated positioning of the element of said final device to move said element when said value is outside of said range in a direction to tend to return the member to within its range of positions, said system having elements providing a plurality of distinct time-constants effective to provide an initial quick response of the electrical condition followed by a slower response when the value of the electrical condition reenters said range following a departure therefrom, whereby stability of the positioning of the element in the final device is attained.

11. In an electrical instrument for measuring or controlling the value of a variable electrical condition in a measuring circuit and including a galvanometer connected with such circuit and including a light source, a mirror, and a phototube, all adapted and arranged to position the reflected image of said light source relative to an edge of said phototube in accordance with changes of said value, and a circuit connected with said phototube to produce current therein in correspondence with the position of said image, the combination with said phototube circuit, measuring circuit and galvanometer of: means having one delaying portion permanently connected with said phototube circuit and another delaying portion connectable with said phototube circuit for further delaying with a distinct and different responsiveness the response of the current in the phototube circuit to changes in said image position when the second named delaying portion is connected with said phototube circuit, means operatively connected with the measuring circuit for balancing the galvanometer, and relay means functioning in dependence upon said current in the phototube circuit to govern the operative connection of the last named portion of the delaying means with said phototube circuit and to govern the operation of the balancing means.

12. The combination set forth in claim 11 in which said relay means comprises two relays having their coils connected with said phototube circuit, said relays having contacts operative at different current values in said phototube circuit, and said relays and their contacts being adapted and arranged to operate the balancing means only when the value of said current is outside of the stated different current values and to connect the second named portion of the current-response delaying means with said phototube circuit only when the current in the phototube circuit is between said different contact-operating values.

13. In an electrical instrument of the measuring and controlling class which is connectable with a source of a variable physical quantity, the combination of a primary member sensitive to the variable, a final device reacting upon said member and to be controlled by said member according to the member-sensed value of the variable, an electrical governing system for the device including a means operatively connected to the primary member to cause a current in said system to be responsive to the member-sensed value of the variable, relay means operable outside of a zone bounded by two different values of the current, said relay means being operatively connected to the final device to cause the operation of said device in a direction to reduce a departure of the current from the zone between its said values only when the value of the current as determined by the relay means is outside of said zone, and means operatively connected with said system and with said relay means to decrease the time-constant of the response of the relay-operating current to a change in the member-sensed value of the variable also only when the value of the current as determined by the relay means is outside of said zone.

14. In an instrument which is connectable to a source of a physical variable to be measured or controlled, the combination of a member continuously positionable in response to changes in the value of the variable, a governing system comprising at least a relay means controlled by and responsively sensitive to the position of said member relative to a fixed normal position upon a change in said value, a reversible motor governed by said relay means, a controlling device having an element operated by said motor to return said member to a fixed normal position upon a change in said value, means also governed by said relay means to advance the phase of said member relative to that of said element, and means for retarding the action of said relay means actuated by said relay means and reacting upon said relay means to increase the retarding action when said member is near its normal position as sensed by said relay means, said relay means being also operatively connected with said motor to cause braking thereof when said member is near its normal position as sensed by said relay means.

15. In an instrument of the measuring and controlling class which is attachable to a source of an electrical variable to be measured or controlled, the combination of a first circuit which is attachable to said source, a galvanometer connected with said circuit and having a member which is movable in accordance with a variable current in the galvanometer portion of said circuit from a normal position corresponding with zero current through said circuit portion, compensating means connected with said circuit for altering the current therein, a reversible motor having appreciable inertia and connected to said compensating means to operate the latter, a second circuit, current-modifying means connected with said second circuit and operated by said galvanometer member to modify the current in said second circuit in correspondence with the position of said member whenever said member is in a position to cause such modification, and relay means operatively connected with said second circuit and continuously sensitive to the current therein, said relay means being operatively connected also with said motor to govern the actuation thereof to reduce the departure of said member from its normal position only when the current in the second circuit is outside of a deadzone limited by two values of the current in the second named circuit which are close to and respectively above and below said normal value and to act to cause braking of said operating means when such current is within said deadzone, and said galvanometer member being continuously free to move both at positions corresponding with said current dead-zone and in adjacent current-modifying positions.

16. In a governing system of a measuring or controlling instrument, in combination, an illuminated mirror galvanometer which is continuously free to deflect from its null-position upon a difference between an independent variable to be measured or controlled and a balancing variable, a phototube located in the path of a light beam from the mirror which deflects when the galvanometer senses said difference and with the beam only partly upon the phototube in the null-position of the galvanometer, means for controlling the balancing variable to rebalance the galvanometer, a relay means connected with and continuously controlled by current from said phototube and operatively connected with the controlling means to govern the balancing of the two variables when the current is outside of a zone including the value corresponding with the null-position of the galvanometer, and damping means operatively connected with and controlled by said relay means to slow the rate of response of the relay means to a change of the position of the light beam sensed by said phototube when the beam is within a zone of positions including the null-position, whereby continuing oscillations of the galvanometer tend to be inhibited or damped out by the damping means when the light beam is only partially on said phototube so that the value of the balancing variable is stably brought into ultimate correspondence with the value of the independent variable.

17. Measuring apparatus including means for impinging a beam of light on a light-sensitive element, a continuously-positionable means for producing deflections of said light beam from a predetermined normal position in accordance with variations in a condition to be measured, means for shifting the position of balance of the second named means by a finite amount from said normal position, and means responsive to the conductivity of said light-sensitive element adapted to control the said continuously-positionable means for gradually reducing the deflections of said beam from said normal position as long as the response of said responsive means indicates that the light beam is appreciably deflected from its normal position, the balance-shifting means being under control of said responsive means to operate to temporarily reduce the effect of such deflection only as long as the stated response indicates that the light beam is appreciably deflected from its normal position.

18. In a stable instrument which is connectable with a source of an electrical variable to be measured or controlled, the combination of a circuit having a slide-wire and a shunting resistor therefor in which an operating current flows to produce potential differences at different points along the slide-wire and shunting resistor, said circuit also including a contact which is slidable along the slide-wire; a galvanometer having a movable member and two terminals of which one is connectable with one side of the source of the electrical variable and the other with the sliding contact, a governing system including a relay means in which a current is responsively sensitive to the position of the galvanometer member when the member is outside of a dead-zone of the relay means, which dead-zone includes the null-position of the member, and a motor for moving the sliding contact at substantially constant speed as long as the relay means is effective, said relay means being arranged to selectively connect the other side of said source with points in said circuit having substantially the same potential as points so widely spaced along the shunting resistor as to apply by the operation of the relay means such a large galvanometer-advancing constant voltage upon leaving the dead-zone that, upon re-entering the dead-zone, the galvanometer will be repeatedly kicked back from its position at the instant of the removal of such voltage to again apply the advancing voltage to the system, whereby in rebalancing the sliding contact will proceed to take short steps towards a position which corresponds with the value of the variable being measured.

19. In a measuring or controlling instrument having a final controlled device including a movable element which is to be positioned in correspondence with the value of an independent physical variable to be measured or controlled, the combination of a deflectable member which is sensitive to said variable, a governing system in which the value of a physical condition is responsively sensitive to the deflection of said member, relay means operatively connected with said system to operate when a dead-zone enclosed by two predetermined values of said condition is entered or left by such condition in either direction, a reversible motor having a coil for each direction of rotation which is operatively connected with said relay means and with said element to govern the operation of the element in a direction towards the stated correspondence only when the operation of the relay means indicates that the value of the condition is outside said dead-zone, and means operated by the relay means to short-circuit both of said coils substantially as long as the operation of the relay means indicates that the value of the condition is within said dead-zone.

20. In a measuring or controlling instrument having a final controlled device including a movable element 41 which is to be positioned in correspondence with the value of an electrical variable to be measured or controlled in a circuit including a source 27 of said variable, an electrical system (including 61) for governing the positioning of the final movable element 41 in accordance with the value of an electrical condition of the system, a galvanometer 38 member which is sensitive to said variable and operatively connected with said system (through 81) to govern the value of said condition of said system, relay means 11 and 12 operatively connected with said system to operate when a dead-zone enclosed by two predetermined values of said condition is entered or left by such condition in either direction, a reversible motor 112 which is operatively connected with said relay means 11 and 12 and with said final element 41 to govern the operation of the element 41 in a direction toward the stated correspondence only when the condition of the relay means indicates that the value of the condition is outside said dead-zone, the combination of: means 22 and 23 in Fig. 1 operatively connected with said relay means 11 and 12 and with said galvanometer 38 member and operated by said relay means 11 and 12 to alter the relay-operating positions of the galvanometer 38 member by a predetermined amount to cause earlier relay operation subsequent to reversal of direction of said member than would occur without such altering of the position of said member, and means including a capacitor 88 and connectable with the governing system and operatively connected with the relay means to be operated by the relay means to sharply increase the time-constant of the response of said electrical condition upon a change in the position of the galvanometer when the value of said condition enters the dead-zone as indicated by the operation of the relay means.

21. An instrument of the measuring and controlling class comprising, in combination, an initial member moved in accordance with the value of a physical variable to be measured or controlled, a final movable element and a reversible motor for moving said element, and a governing system operatively connecting said member and said final element to govern the movements of said final element in accordance with those of the initial member, said system comprising: a first means operated by the member to regulate the value of a physical condition of said system in accordance with the position of the member relative to a normal position of the member, a second means for altering the sensitivity or ratio of the change in the value of the physical condition to the amount of movement of the member, a third means for altering the time-constant of response of the value of said physical condition to provide a plurality of distinct time-constants of delayed response of said physical condition, and a fourth means sensitive to the value of the delayed response of said physical condition and operated at the edges of a zone of said values which includes the value which corresponds with a steadily-held normal position of the member, said fourth means being operatively connected with the motor, the second means and the third means to operate the motor when said value is outside of said zone to move the final element to a position which depends upon that of said member, to operate the second means when the said zone is re-entered by said value following a departure therefrom to then provide an at least initial lowering of the sensitivity, and to operate the third means to provide an increased value of said time-constant when the operation of the fourth means indicates that said value is within said zone.

22. A governing system for a controlled device comprising, in combination, a circuit which is connectable with a source of current supply, means connected with the circuit for modifying the current in the circuit from a normal value in response to departures of the value of a physical variable with which the value of the current in the circuit ultimately corresponds from a predetermined value which is set to correspond with said normal value of the current in said circuit, a relay means connected with the circuit and actuated by the current therein upon a departure from or return to a zone of circuit current values which includes said normal value, a means for controlling said device operatively connected with the relay means to be governed thereby when the operation of the relay means indicates that the current in said circuit is outside of said zone, and means connected with the circuit by the relay means for abruptly altering the response of the current to the stated changes when said relay means operates to then cause said circuit to have two complementally effective distinct time-constants of response with the time-constants of a different order of magnitude and with the slower response effective within said zone of current in said circuit.

23. A governing system comprising, in combination, a circuit which is connected with a source of current supply, photoresponsive means connected with the circuit for modifying the current therein from a normal value in response to changes in its illumination, a means for altering said illumination in accordance with changes in the value of a physical condition, a motor, means operated by the motor to restore the illumination of the photoresponsive means to said normal value, a relay means connected with the circuit and actuated by the current therein and with said motor to govern the operation thereof, and means connected with the circuit by the relay means for damping the response of the current to the stated changes to cause said circuit to have two complementally effective distinct time-constants of said response with the time-constants of a different order of magnitude.

24. The combination set forth in claim 23 in which said relay means comprises two relays having their coils connected with said circuit, said relays having contacts for making the stated connections and being constructed to operate said contacts at different values of the current which values establish a zone that includes the value that ultimately corresponds with the normal illumination, and said relays being constructed and arranged to abruptly connect the damping means to the circuit when said current is within said zone to then slow the response of said current to changes of said illumination and to govern the operation of the motor when said current is outside said zone.

CHARLES O. FAIRCHILD.